US011397305B2

(12) United States Patent
Rendlen (10) Patent No.: US 11,397,305 B2
(45) Date of Patent: Jul. 26, 2022

(54) SELF-CENTERING LOCKING LENS HOLDER

(71) Applicant: ShopperTrak RCT Corporation, Chicago, IL (US)

(72) Inventor: Jeffrey R. Rendlen, Chicago, IL (US)

(73) Assignee: SHOPPERTRAK RCT CORPORATION, Chicago, IL (US)

(*) Notice: Subject to any disclaimer, the term of this patent is extended or adjusted under 35 U.S.C. 154(b) by 387 days.

(21) Appl. No.: 16/502,897

(22) Filed: Jul. 3, 2019

(65) Prior Publication Data

US 2021/0003809 A1 Jan. 7, 2021

(51) Int. Cl.
*G02B 7/02* (2021.01)

(52) U.S. Cl.
CPC .................. *G02B 7/023* (2013.01)

(58) Field of Classification Search
CPC ........ G02B 7/022; G02B 7/023; G02B 5/134; F16B 39/282; F16B 39/24; F16B 39/32; F16B 39/36; F16B 39/38
See application file for complete search history.

(56) References Cited

U.S. PATENT DOCUMENTS

| 9,513,458 B1* | 12/2016 | Flugge .................. G02B 7/022 |
| 2017/0139226 A1* | 5/2017 | Adervall ................ H04N 7/183 |
| 2019/0117412 A1* | 4/2019 | Zimmerman ......... A61F 2/4684 |

FOREIGN PATENT DOCUMENTS

CN 106338806 A * 1/2017

* cited by examiner

*Primary Examiner* — Ephrem Z Mebrahtu
(74) *Attorney, Agent, or Firm* — ArentFox Schiff LLP (57) ABSTRACT

An assembly and a locking member for locking and centering a threaded lens assembly with relation to a lens base is disclosed. The locking member includes a threaded through hole configured to thread onto one of a threaded lens base or the threaded lens assembly. The locking member further includes an interlocking portion configured to engage with a receiving portion of the other of the threaded lens base or a threaded lens assembly, wherein the engagement between the interlocking portion and the receiving portion prevents the threaded lens assembly from moving with relation to the lens base.

19 Claims, 5 Drawing Sheets

FIG. 9

SELF-CENTERING LOCKING LENS HOLDER

FIELD OF THE INVENTION

The present disclosure relates generally to a lens holder apparatus for an optical system. Specifically, for a lens holder that allows for the adjustment and locking of a focal length or focal point of a lens with relation to an imaging sensor.

BACKGROUND

Advances in imaging devices and imaging analysis have allowed for the detection and tracking of people to ensure security, safety, and site management. Example implementations include the estimation of queue length in retail outlets, the monitoring of entry and/or exit points, bus terminals, airports, or train stations. The detection and tracking of people may be implemented via the monitoring and analysis of a monocular video feed using a single imaging device or of a stereo or multi-sensor video stream using a plurality of imaging devices.

The aforementioned imaging device may include an imaging or light sensor that is capable of detecting light or an "image" focused though a lens or plurality of lenses. In order to render a focused image, the focus point or focal plane of the aforementioned lens or plurality of lenses may be manually or automatically adjusted by setting a distance between the lens and the detection surface of the imaging or light sensor.

SUMMARY

In accordance with one aspect of the disclosure a locking member for locking and centering a threaded lens assembly with relation to a lens base is disclosed. The locking member may include a threaded through hole configured to thread onto one of a threaded lens base or the threaded lens assembly. The locking member may further include at least one interlocking portion configured to engage with a receiving portion of the other of the threaded lens base or a threaded lens assembly, wherein the engagement between the interlocking portion and the receiving portion prevents the threaded lens assembly from moving with relation to the lens base.

In accordance with another aspect of the disclosure, a lens mounting system is disclosed. The lens mounting system includes a lens base having a mounting portion at a first lens base end, an engagement grove proximal to a second lens base end, and a through hole extending from the first end to the second end of the lens base, the through hole being internally threaded via first internal threads. The system may further include a lens assembly having a lens mount at a first lens mount end, wherein the lens assembly comprises second threads that are configured to be threaded into the first threads. The system may further include a locking member having a through hole having third internal threads that are configured to be threaded onto the second threads of the lens assembly and a locking protrusion configured to be received within engagement groove, wherein, when the second threads are threaded into the first threads, a rotation of the lens assembly in a first direction with relation to the lens base causes a distance between the first lens base end and the first lens mount end to decrease and a rotation of the lens assembly in a second direction, opposite the first direction, with relation to the lens base causes a distance between the first lens base end and the first lens mount end to increase.

In accordance with another aspect of the disclosure, a lens base configured to receive a lens assembly is disclosed. The lens base includes a first base end and a mounting portion at a second base end. The lens base further includes a threaded through hole extending from the first end of the lens base to the second end of the lens base, wherein the through hole is internally threaded via first internal threads, and an engagement groove proximal to the first end.

Additional advantages and features of these aspects will be set forth in part in the description that follows, and in part will become more apparent to those skilled in the art upon examination of the following or upon learning by practice of the disclosure.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting. Further, it will be obvious to one skilled in the art that the present invention may be practiced without these specific details. In other instances, well-known methods, procedures, and components have not been described in detail so as to not unnecessarily obscure aspects of the present invention.

Throughout the disclosure the term substantially may be used as a modifier for a geometric relationship between elements or for the shape of an element or component. While the term substantially is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially may include a variation of less than 5% of the object or component. If substantially is used to define the angular relationship of one element to another element, one non-limiting example of the term substantially may include a variation of 5 degrees or less. These examples are not intended to be limiting and may be increased or decreased based on the understanding of acceptable limits to one of ordinary skill in the art.

For purposes of the disclosure, directional terms are expressed generally with relation to a standard frame of reference when the system and apparatus described herein is installed and in an in-use orientation.

Throughout the disclosure a light or "image" sensor is described in the context of a camera system for detecting and/or tracking of people. However, it is noted that the current disclosure is usable with any imaging system, which may for example be coupled or form a portion of a Printed Circuit Board ("PCB"). The term light or image sensor may be used interchangeably throughout the disclosure and may include any known sensor. Some example image sensors useable with the current disclosure may include charged coupled device ("CCD") sensors, and/or complementary metal-oxide-semiconductor ("CMOS") sensors which may be mounted to a PCB.

It is also noted that while in the example implementation is described as an apparatus for setting a focal length of a lens or plurality of lenses with respect to a sensor are described, the features of the current disclosure are applicable to any system or apparatus in which aspects of the current disclosure would provide an advantage. For example, an implementation of the disclosure may be usable for any system or application requiring the setting of distance between two devices or objects, which may for example include examples such as setting a distance and/or alignment of a sensor or a distance between an emission device and a detector or receiving device. Further, the locking apparatus in the current disclosure may be useable in any system usable with a threaded interface between two objects, wherein locking of an orientation between the two objects would be advantageous.

In order to provide context to the current disclosure, a broad overview of the discovered deficiencies of various systems and an example implementation of the current disclosure and the advantages provided by the disclosure are described below. Further details of example implementations of the current disclosure are described detail with reference to the figures below.

Figure 1:
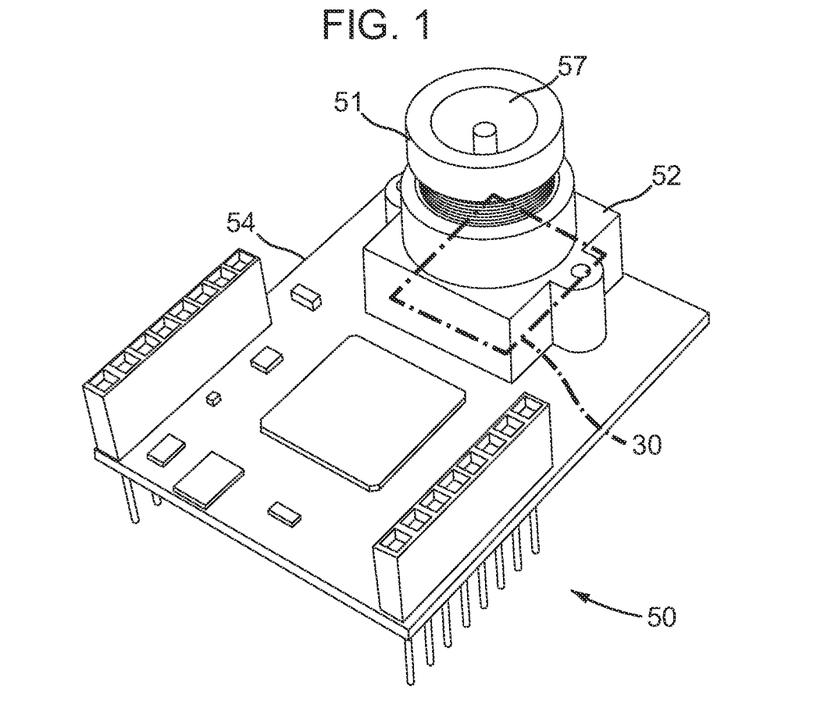
FIG. 1 is a top perspective view of an example camera system usable with aspects of the present disclosure.

FIG. 1 shows one example of an imaging system 50 with a PCB 54 including an image sensor 30, a lens mounting base 52 and a lens assembly 51. The lens assembly 51 may include a lens mounted to a threaded lens housing that is capable of being threaded into the mounting base 52 via threads that correspond to the threads on the threaded lens housing. In order for the image detected by the image sensor 30 to be properly focused, a focal plane or focus point of the lens may need to adjusted. One method of adjusting the focal plane or focus point at the sensor is to rotate the lens assembly 51 to adjust the distance between a lens 57 and the sensor 30. However, once the focal plane or focus point is adjusted, changes in temperature, movement of the camera device and/or vibration may cause the focus of the system to be altered inadvertently causing out-of-focus images to be produced by the system and requiring adjustment. Thus, once the focal plane or focus point is properly adjusted in a camera system, locking or otherwise preventing the lens assembly from rotating (and thus altering the focus) would be advantageous to prevent out-of-focus images from being produced by the sensor and to reduce or prevent the necessity of additional adjustment of the lens.

Figure 2:
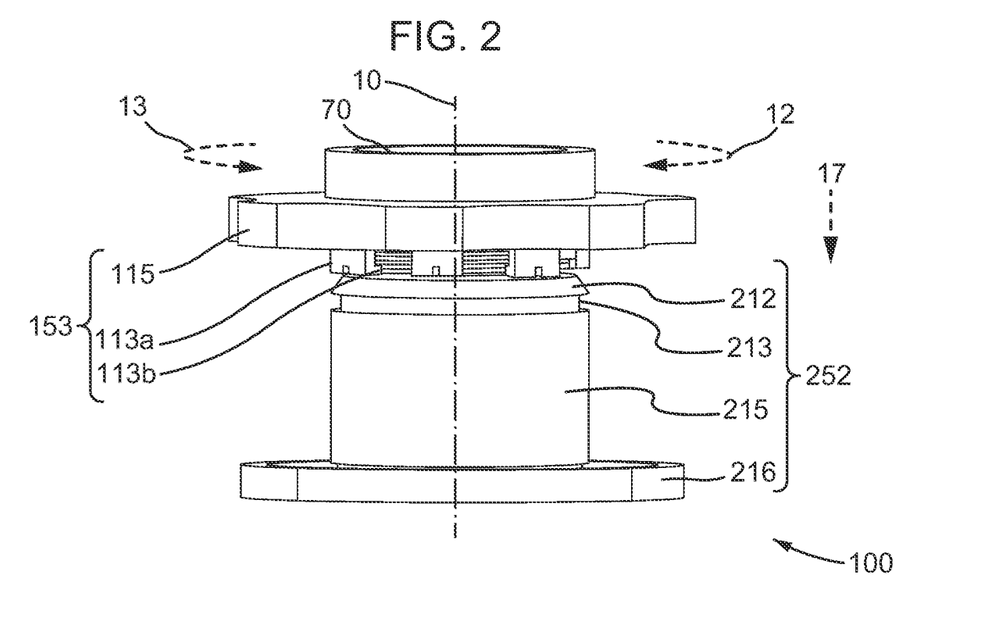
FIG. 2 is a side perspective view of an example lens mounting system in a first state of operation in accordance with one aspect of the present disclosure.
Figure 3:
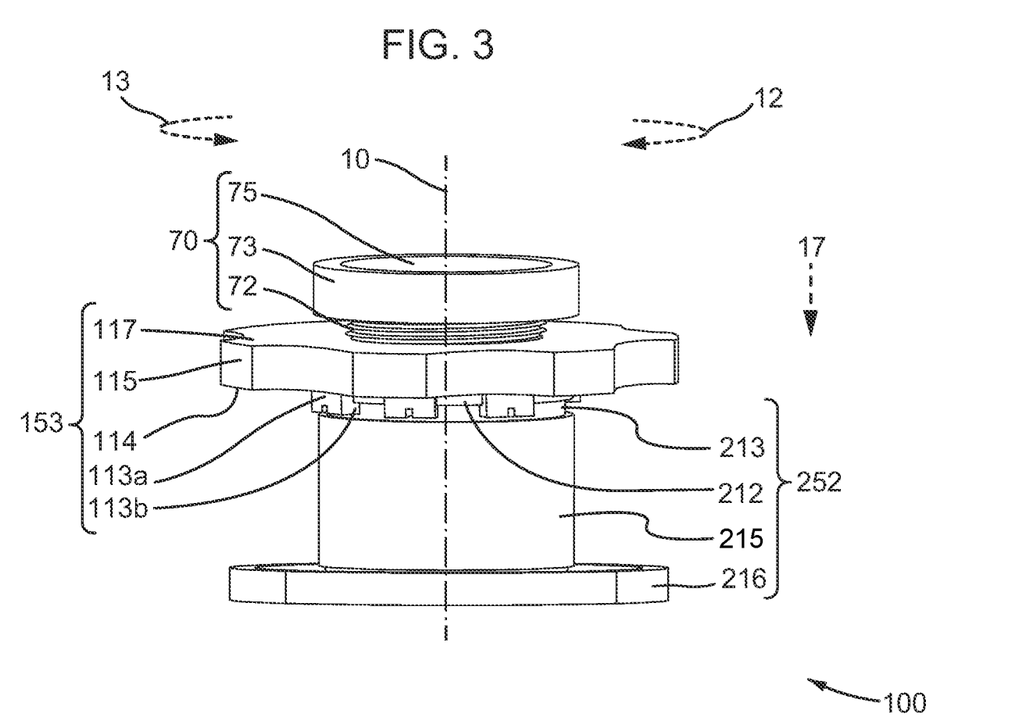
FIG. 3 is a side perspective view of an example lens mounting system of FIG. 2 in a second state of operation in accordance with an aspect of the present disclosure.
Figure 4:
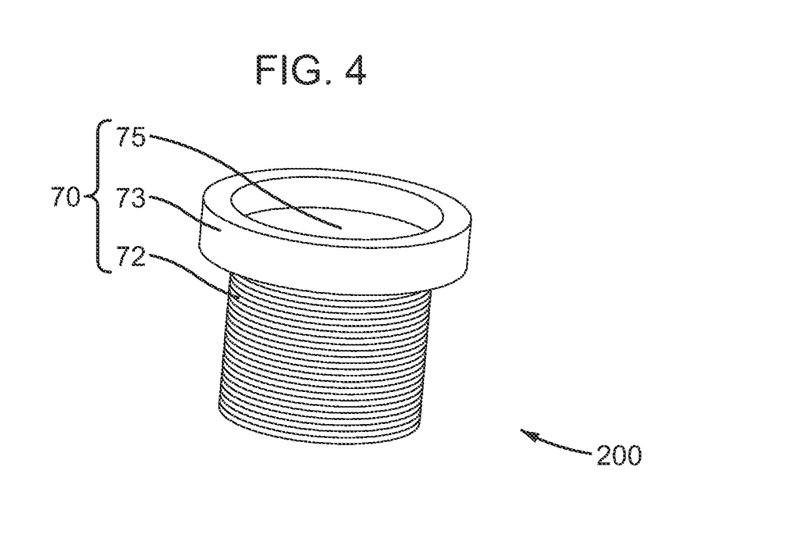
FIG. 4 is a side perspective view of the example lens assembly of FIGS. 1 and 2 in accordance with one aspect of the present disclosure.

As shown in FIG. 2, the lens mounting system 100 may include a lens assembly 70 with a lens 75 (FIG. 3). As best shown in FIGS. 3 and 4, the lens assembly 70 is formed as a hollow or tubular cylindrical or annular member with a lens 75 proximal to a first end of the lens assembly 70. The lens assembly 150 may be symmetrical about a first axis or center axis 10. The assembly may further include a first non-threaded region 73 proximal to the first end. Lens assembly threads 72 may extend along the first axis from the non-threaded region 73 to a second end of the lens assembly 150.

Figure 5:
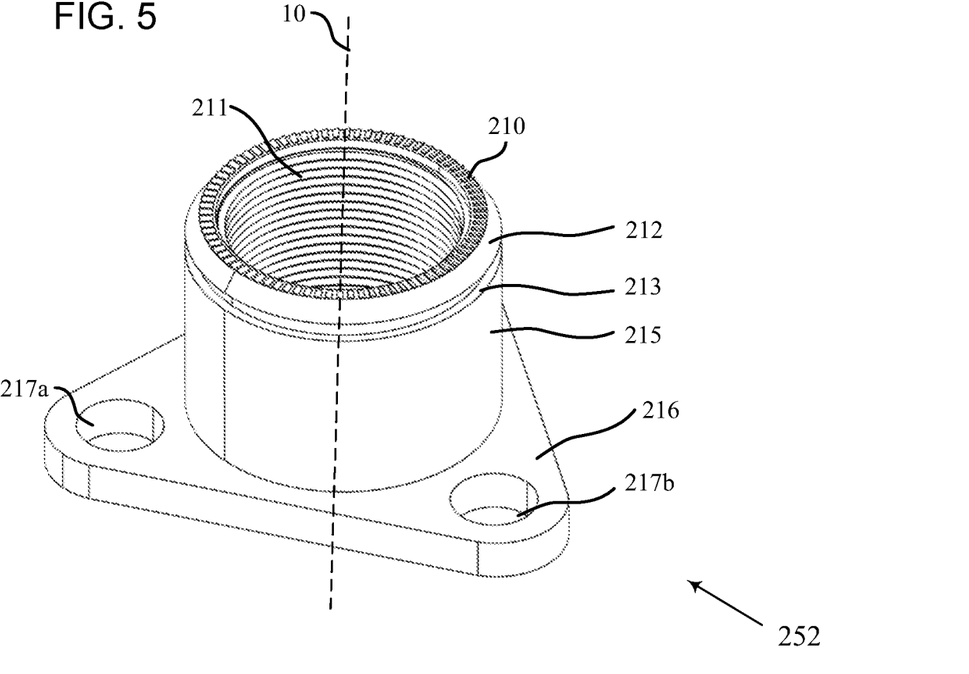
FIG. 5 is a side perspective view of the example lens base of FIGS. 2-4 in accordance with one aspect of the present disclosure.
Figure 6:
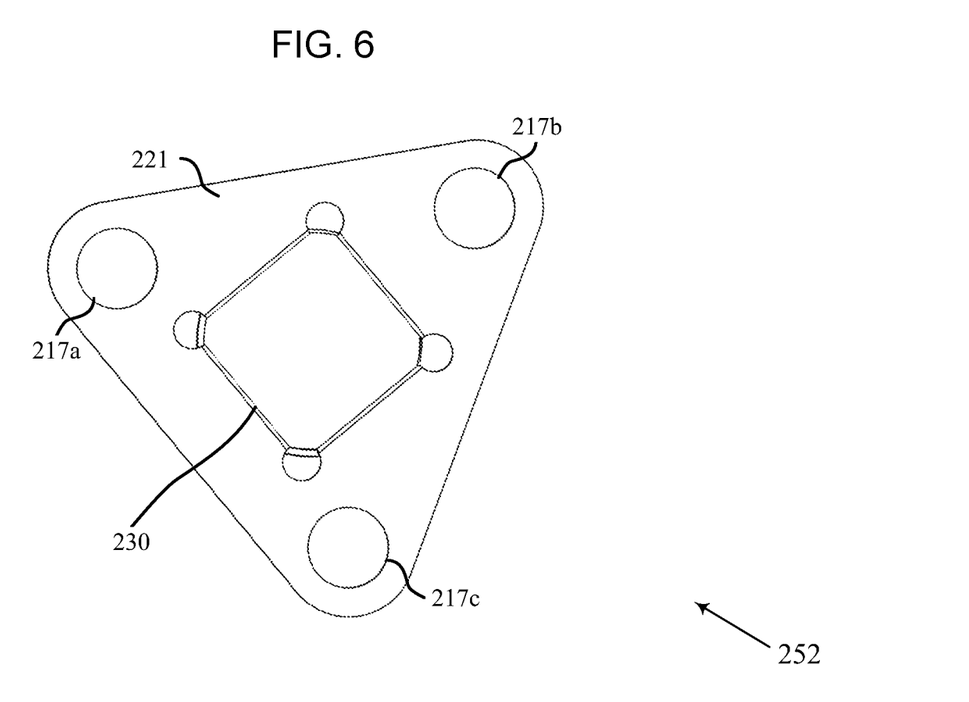
FIG. 6 is a bottom view of the example lens base of FIGS. 2-5 in accordance with one aspect of the present disclosure.
Figure 7:
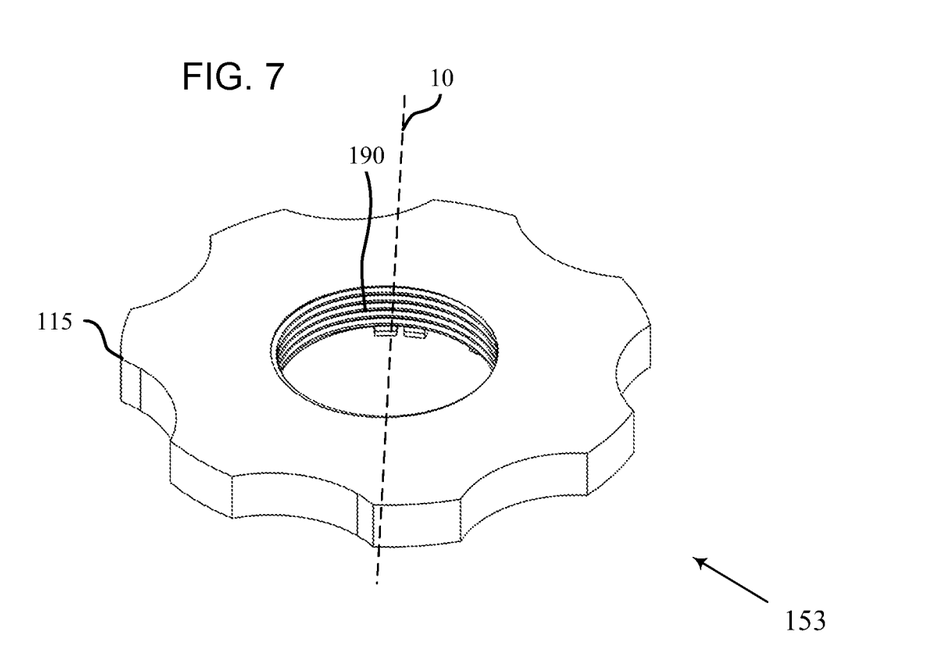
FIG. 7 is a top perspective view of the example locking mechanism of FIGS. 2-5 in accordance with one aspect of the present disclosure.

The lens assembly threads 72 may be configured to thread into corresponding second threads 211 (FIG. 5 of a lens base 252. A lens base 252 may include a hollow cylindrical portion 215 that extends from a first end of the lens base 252 to a second end of the lens base 252, and that may be symmetrical about the first axis 10 (FIG. 2). The lens base 252 may further include a mounting portion 216, which may hereinafter be interchangeably referred to as a flange portion with mounting features 217a-c (FIG. 5). In one example, the mounting feature 217a-c may for example be through holes that align with and that are capable of mounting to a PCB or other mounting feature at or near an image sensor (e.g., ref. 30 in FIG. 1). The second threads 211 of the lens base 252 may extend from a first end of the lens base 252 to the flange portion 216 at a second end of the lens base. The lens base 252 may further an engagement groove 213, which may hereinafter be interchangeably referred to as a receiving portion. The receiving portion 213 may be formed as an annular groove proximal to a first end of the lens base 252. The first end of the lens base 252 may further include a ramp region 212 that tapers from a decreased diameter at the first end of the lens base to a second greater diameter at a location proximal to receiving portion 213. As described in further detail below, the receiving portion 213 may be configured to receive a corresponding received portion 113b of a locking member 153. The lens base 252 may further include a lens base ridged portion 210 (FIG. 5) that is configured to interact or intermesh with a locking member ridged portion 180 (FIG. 8) of the locking member 153. The lens base 252 may further include a sensor receiving opening 230 (FIG. 6) dimensioned to receive an image sensor (e.g., ref. 30 in FIG. 1), for example, when the flange portion 216 (FIG. 2) is coupled with or mounted to PCB 54 (FIG. 1).

Figure 8:
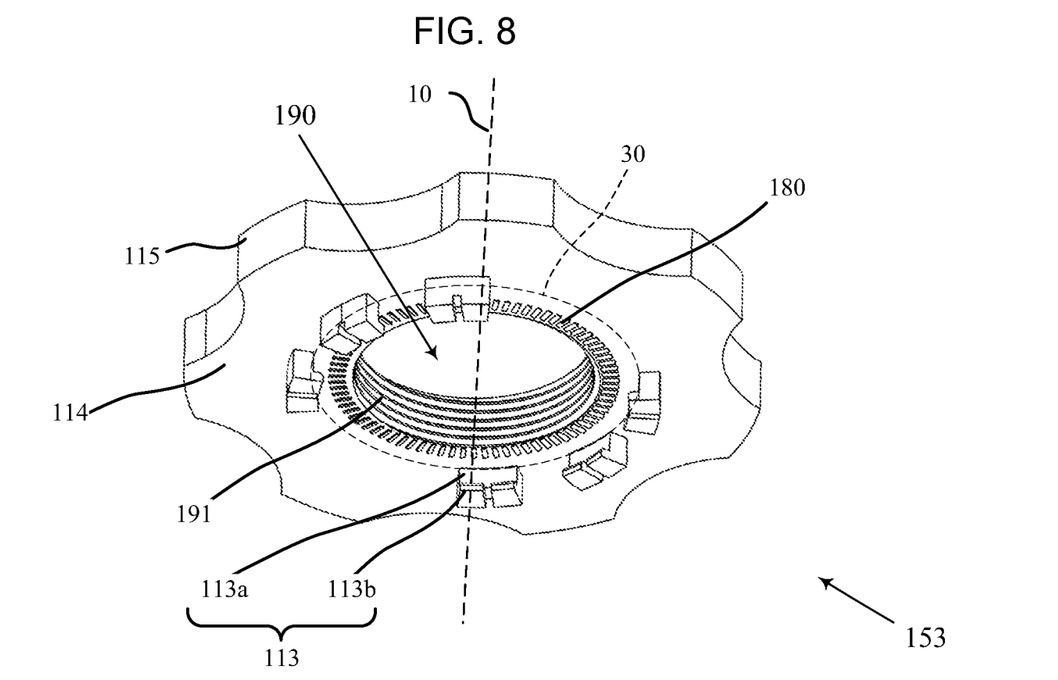
FIG. 8 is a bottom perspective view of the example locking mechanism of FIGS. 2-7 in accordance with one aspect of the disclosure.

The lens mounting system 100 may further include a locking member 153. The locking member 153 may include a threaded through hole 190 extending from a first surface 117 (FIG. 3) to a second surface 114, the threaded through hole 190 may locking member threads 191 that correspond with and are configured to receive the lens assembly threads 72 of the lens assembly 150. The threads forming threaded hole 190 may further have a major diameter and a minor diameter and corresponding major radius and minor radius. The major diameter of an internal thread may be the smaller of two extreme diameters delimiting the height of the thread profile, as a cross-sectional view is taken in a plane containing the axis of the threads; the minor diameter may be the larger of the two extreme diameters of the thread. Likewise, the major diameter of an external thread may be the greater of two extreme diameters delimiting the height of the thread profile, as a cross-sectional view is taken in a plane containing the axis of the threads; the minor diameter may be the smaller of the two extreme diameters of the thread. The locking member 153 may further include a single or plurality of locking portion(s) 113 (FIG. 8). Each of the locking member(s) 113 may include a locking protrusion 113a that protrudes from the second surface 114. Each locking protrusion 113a protrudes in a direction substantially perpendicular to the second surface 114. Each locking portion 113 may further include a received portion 113b that is substantially perpendicular to each locking protrusion 113a. Each received portion 113b may be configured to be received within receiving portion 213 of the lens base 252. The locking member 153 may further include a gripping portion 115, which may include a series of concave gripping portions. As best shown in FIG. 8, each locking portion 113 may be arranged at a similar or equal distance from a center axis 10 of the threaded through hole 190. Further, each locking portion 113 may be located a first distance from the center axis 10. Further, the first distance may be greater than the minor radius and major radius of the threads forming threaded hole 190.

In use, the threaded hole 190 of the locking member 153 may be threaded onto the lens assembly threads 72 of lens assembly 150. The locking member 153 and threaded lens assembly 150 may be threaded into the second threads 211 of the threaded lens base 252 as shown in FIG. 1. The lens assembly 150 may be rotated in a first direction 13 or a second direction 12 to adjust the focal point or plane of the lens with relation to a sensor (e.g., ref. 30 in FIG. 1), which may be located within the sensor receiving opening 230 (FIG. 6) of the lens base 252. In order to lock the focal point or focus of the lens, once the focal point or plane of the lens 70 is adjusted as desired, the lens assembly 150 may be held or kept stationary with relation to the base 252 and the locking member 153 may be rotated in the second direction 12, causing the locking member 153 to move in direction 17 (FIGS. 2 and 3). As shown in FIG. 3, once the locking member 153 is rotated in the second direction 12 and moves in direction 17, the received portion 113b of each locking portion 113 passes over the ramp region 212 and is received by receiving portion 213. Further, rotation of the locking member 153 in the second direction 12 may cause the lens base ridged portion 210 to contact the locking member ridged portion 180 thus causing the lens assembly 150 to lock with relation the lens base 252 and self-center via the interaction between lens assembly threads 72 of the lens assembly 150 and the second threads 211 of the lens base 252. Thus, once the locking member 153 is threaded in the second direction so that the locking member ridged portion 180 applies a force to the lens base ridge portion 210, the interaction between the locking member ridged portion 180 and lens base ridged portion 210 and/or the received portion 113b and the receiving portion 213 prevents the rotation (and thus movement) of the lens assembly 150 with relation to the lens base 252. Thus, preventing inadvertent alteration of the focal point or focus of the lens assembly 150.

Figure 9:
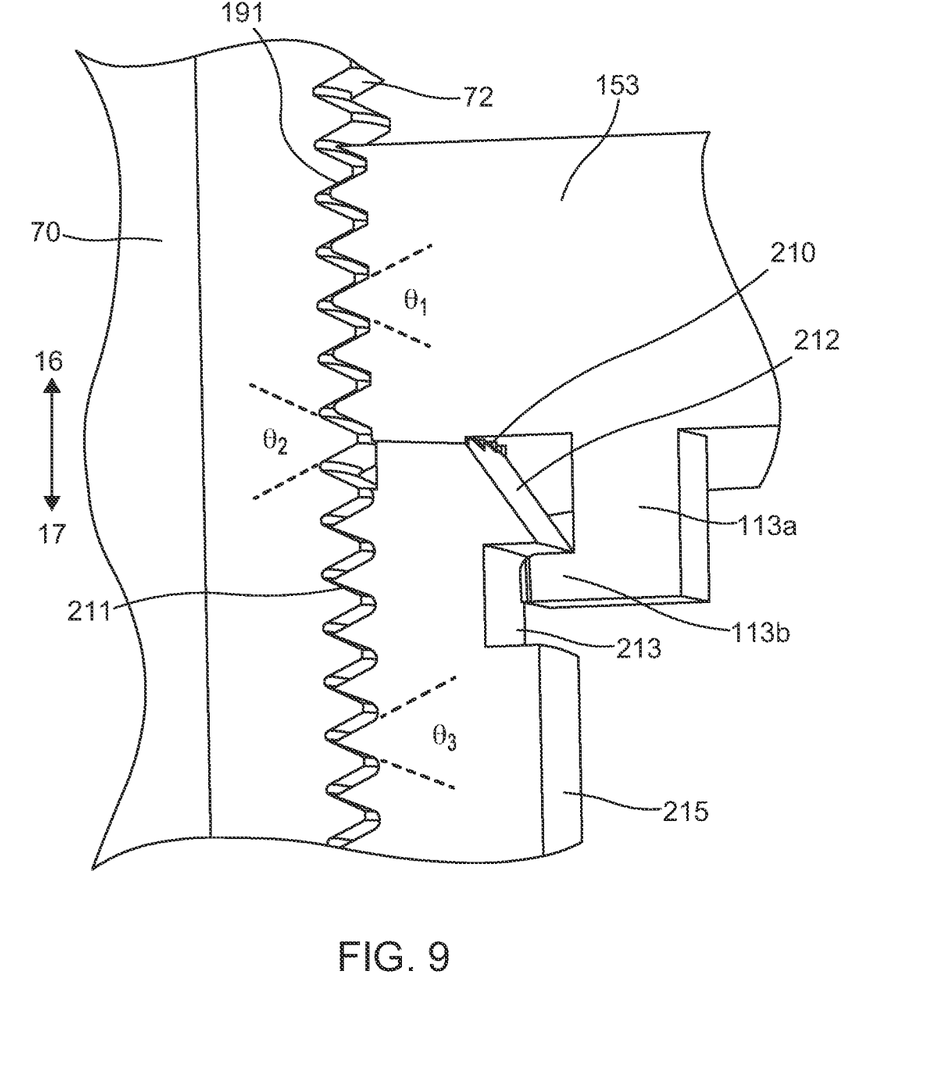
FIG. 9 shows a partial enlarged cross-sectional view of the example lens mounting system of FIGS. 2 and 3 in the second state.

As discussed above, once the lens assembly 70 is threaded into base 252, the locking member 153 may be rotated in the second direction 12 until the lens base ridged portion 210 contacts the locking member ridged portion 180 thus causing the lens assembly 150 to lock with relation the lens base 252 via the interaction between the lens assembly threads 72 of the lens assembly 150 and the lens base threads 211 of the lens base 252. However, along with the locking described above, the force provided by the locking member 153 against lens base 252 may cause an interaction between the lens assembly threads 72 of the lens assembly 150 and the lens base threads 211 of the lens base which cause the lens assembly 70 to center or self-center with relation to the lens base 252. FIG. 9 shows a partial enlarged cross-sectional view of the interaction between the lens assembly threads 72 of the lens assembly 70 and the lens base threads 211 of the lens base when the locking member 153 is threaded via an interaction between the locking member threads 191 and lens base threads 211 so as to contact lens base 252. As best shown with reference to FIG. 9, rotation of the locking member 153 in the second direction 12 (FIG. 3) when the locking member ridged portion 180 is in contact with the lens base ridged portion 210, causes the locking member threads 191 of the locking member to apply a first force, which may be in a substantially upward direction 16, against lens assembly threads 72 of the lens assembly 70. The first force, in upward direction 16, may further cause the lens assembly threads 72 of the lens assembly to move in upward direction 16 with relation to the lens base 252, which may cause the lens assembly threads 72 to be held against lens base threads 211 in upward direction 16, which causes the lens assembly 70 to self-center with relation to lens base 215 due to the interaction between the angled surfaces of the lens assembly threads 72 and the lens base threads 211.

In one aspect of the disclosure the angle formed by each individual tooth of the base lens base threads 211 may differ from the angle formed by each individual tooth of the lens assembly threads 72. This difference in angles may further improve the self-centering of the lens assembly 70 with relation to the lens base 215. As shown in FIG. 9, in one example, each tooth of the locking member threads 191 may form an angle θ1, each tooth of the lens assembly threads 72 may form an angle θ2, and each tooth of the lens base threads 211 may form an angle θ3. In the aforementioned example, angle θ3 may for example be greater than θ2, which provides a steeper angle surface for the lens assembly threads 72 to travel along as the locking member 153 is tightened against lens base 215. In one example, angle θ3 may for example be between three degrees and eight degrees greater than θ2. In another example, angle θ3 may for example be between four degrees and seven degrees greater than θ2. In yet another example, angle θ3 may for example be six degrees greater than θ2. Further, angle θ1 may be equal to or substantially equal to angle θ3. In yet another example θ3 may be greater than θ1. In each of the aforementioned examples, the noted difference in angles between lens assembly threads 72, locking member threads 191 and/or the lens base threads 211 may further improve the centering of the lens assembly 70 with relation to lens base 215 when the locking member 153 is rotated in the second direction 12 (FIG. 3) once the locking member ridged portion 180 is in contact with the lens base ridged portion 210.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A locking member for locking and centering a threaded lens assembly with relation to a lens base, comprising:
    a threaded through hole configured to thread onto one of a threaded lens base or the threaded lens assembly;
    an interlocking portion configured to engage with a receiving portion of the other of the threaded lens base or the threaded lens assembly, wherein the engagement between the interlocking portion and the receiving portion prevents the threaded lens assembly from rotating with relation to the lens base, wherein the thread of the threaded through hole has a major diameter and a minor diameter and the threaded through hole extends from a first surface at a locking member first end to a second surface at a locking member second end, wherein the interlocking portion comprises a plurality of locking protrusions protruding from the locking member second end, and wherein the plurality of locking protrusions are arranged around the through hole at a locking protrusion diameter that is greater than the major diameter of the thread of the threaded through hole.

2. The locking member of claim 1, wherein the threaded through hole is configured to receive the threaded lens assembly, wherein rotation of the locking member with relation to the threaded lens assembly causes the interlocking portion to engage with the receiving portion of the lens base.

3. The locking member of claim 1, wherein locking member further comprises a circular locking member ridged portion configured to intermesh with a lens base ridged portion, wherein the intermeshing between the locking member ridged portion and the lens base ridge portion prevents rotation of the locking member with respect to the lens base.

4. The locking member of claim 1, wherein each of the plurality of protrusions includes a received portion that extends from each respective protrusion, wherein the received portion is configured to slideably engage with a ramp region of the receiving portion of the lens base when the locking member is threaded towards the lens base.

5. The locking member of claim 4, wherein the interaction between the ramp region of the lens base and the received portion guides the received portion into the receiving portion of the lens base to lock the threaded lens assembly with relation to the lens base.

6. The locking member of claim 1, further comprising a gripping portion.

7. The locking member of claim 6, wherein the gripping portion comprises a series of concavities to allow a user to grip the locking member and rotate the locking member with respect to at least one of the lens assembly and the lens base.

8. A lens mounting system, comprising:
    a lens base having an engagement groove proximal to a first lens base end, and a mounting portion at a second lens base end, a through hole extending from the first lens base end to the second lens base end, the through hole being internally threaded via first internal threads;
    a lens assembly having a lens at a first lens mount end, wherein the lens assembly comprises second threads that are configured to be threaded into the first internal threads; and
    a locking member having a through hole having third internal threads that are configured to be threaded onto the second threads of the lens assembly and an interlocking portion comprising a plurality of locking protrusions configured to be received within the engagement groove, wherein, when the second threads are threaded into the first internal threads, a rotation of the lens assembly in a first direction with relation to the lens base causes a distance between the second lens base end and the first lens mount end to decrease and a rotation of the lens assembly in a second direction, opposite the first direction, with relation to the lens base causes a distance between the second lens base end and the first lens mount end to increase, wherein the through hole extends from a first surface at a locking member first end to a second surface at a locking member second end, and wherein the plurality of locking protrusions of the interlocking portion protrude from the locking member second end.

9. The lens mounting system of claim 8, wherein rotation of the locking member in the first direction with relation to the lens assembly causes the interlocking portion to engage with the engagement groove of the lens base and prevents the lens assembly from rotating with relation to the lens base.

10. The lens mounting system of claim 8, wherein the lens base further comprises a ramp region that tapers from a decreased diameter at the first lens base end of the lens base to a second greater diameter at a location proximal to the engagement groove.

11. The lens mounting system of claim 8, wherein the third internal thread of the threaded through hole of the locking member has a major diameter and a minor diameter, and wherein the plurality of locking protrusions are arranged around the through hole at a locking protrusion diameter that is greater than the major diameter of the thread of the threaded through hole.

12. The lens mounting system of claim 8, wherein locking member further comprises a circular locking member ridged portion and a lens base ridged portion configured to intermesh with the locking member ridged portion, wherein the intermeshing between the locking member ridged portion and the lens base ridge portion prevents rotation of the locking member with respect to the lens base.

13. The lens mounting system of claim 8, wherein the lens base further comprises a ramp region, wherein each of the plurality of protrusions includes a received portion that extends from each respective protrusion, wherein the received portion is configured to slideably engage with a ramp region of the lens base when the locking member is threaded towards the lens base.

14. The lens mounting system of claim 13, wherein the interaction between the ramp region of the lens base and the received portion guides the received portion into the engagement groove of the lens base to lock the threaded lens assembly with relation to the lens base.

15. The lens mounting system of claim 8, further comprising a gripping portion.

16. The lens mounting system of claim 15, wherein the gripping portion comprises a series of concavities to allow a user to grip the locking member and rotate the locking member with respect to at least one of the lens assembly and the lens base.

17. A lens base configured to receive a lens assembly, comprising:
- a first base end;
- a mounting portion at a second base end;
- a threaded through hole extending from the first end of the lens base to the second end of the lens base, wherein the through hole is internally threaded via first internal threads; an engagement groove proximal to the first end; and
- a ramp region that tapers from a decreased diameter at the first end of the lens base to a second greater diameter at a location proximal to the engagement groove.

18. The lens base of claim 17 further comprising a lens base ridged portion at the first end of the lens base, wherein the lens base ridged portion is configured to intermesh with a circular locking member ridged portion of a locking member, wherein the intermeshing between the locking member ridged portion and the lens base ridged portion prevents rotation of the locking member with respect to the lens base.

19. The lens base of claim 17, wherein the ramp region is configured to slideably engage with a plurality of protrusions of a locking member when the locking member is threaded towards the lens base, and wherein the interaction between the ramp region of the lens base and the plurality of protrusions guides respective received portions of the protrusions into the engagement groove of the lens base to lock a threaded lens assembly with relation to the lens base.

\* \* \* \* \*